(12) United States Patent
Koike et al.

(10) Patent No.: US 8,989,942 B2
(45) Date of Patent: Mar. 24, 2015

(54) VEHICLE START NOTIFICATION CONTROL DEVICE

(71) Applicant: Honda Motor Co., Ltd., Minato-ku, Tokyo (JP)

(72) Inventors: Masaki Koike, Wako (JP); Yoshikazu Imura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/166,073

(22) Filed: Jan. 28, 2014

(65) Prior Publication Data

US 2014/0214252 A1 Jul. 31, 2014

(30) Foreign Application Priority Data

Jan. 29, 2013 (JP) .................. 2013-014727

(51) Int. Cl.
*B60L 9/00* (2006.01)
*B60Q 5/00* (2006.01)
*B60W 10/18* (2012.01)
*B60W 10/30* (2006.01)

(52) U.S. Cl.
CPC ............. *B60Q 5/008* (2013.01); *B60W 10/18* (2013.01); *B60W 10/30* (2013.01)
USPC ........................................ 701/22

(58) Field of Classification Search
None
See application file for complete search history.

(56) References Cited

U.S. PATENT DOCUMENTS

| 6,325,469 B1 * | 12/2001 | Carson et al. ................. 303/140 |
| 6,332,654 B1 * | 12/2001 | Yano ............................... 303/89 |
| 8,579,765 B2 * | 11/2013 | Yu et al. ......................... 477/184 |
| 8,712,615 B2 | 4/2014 | Omote et al. |
| 2007/0080583 A1 * | 4/2007 | Noumura et al. ............ 303/175 |
| 2008/0009990 A1 * | 1/2008 | Katoh et al. ..................... 701/36 |
| 2008/0097675 A1 * | 4/2008 | Konishi et al. .................. 701/75 |

(Continued)

FOREIGN PATENT DOCUMENTS

| JP | 2009-214583 A | 9/2009 |
| JP | 2012-162146 A | 8/2012 |

(Continued)

OTHER PUBLICATIONS

Japanese Office Action (Notice of Reason for Rejection) dispatched on Sep. 2, 2014, in respect to the counterpart JP Patent Application 2013-014727.

*Primary Examiner* — Thomas Tarcza
*Assistant Examiner* — Adam Alharbi
(74) *Attorney, Agent, or Firm* — Carrier Blackman & Associates, P.C.; Joseph P. Carrier; Anne G. Sabourin (57) ABSTRACT

Start notification is performed at appropriate timing by vehicle having braking force holding function to hold braking force even if brake application operation by driver is deactivated. Vehicle start notification control device includes speaker for performing start notification to notify behavior related to start of vehicle to surroundings of vehicle, control section for applying braking force to vehicle, corresponding to brake applying operation by driver of vehicle and performing control to hold braking force of vehicle even if brake applying operation is deactivated, and braking force holding flag setting section for setting ON or OFF of braking force holding flag for holding braking force of vehicle even if brake applying operation is deactivated. Control section controls speaker to perform start notification if both brake applying operation and ON setting of braking force holding flag are deactivated.

3 Claims, 4 Drawing Sheets

(56) References Cited

U.S. PATENT DOCUMENTS

| | | | |
|---|---|---|---|
| 2010/0094512 A1* | 4/2010 | Corniglion et al. | 701/48 |
| 2010/0100278 A1* | 4/2010 | Saito | 701/34 |
| 2010/0174464 A1* | 7/2010 | Teyssier | 701/70 |
| 2011/0136625 A1* | 6/2011 | Yu et al. | 477/185 |
| 2012/0173080 A1* | 7/2012 | Cluff | 701/42 |
| 2012/0203433 A1 | 8/2012 | Higa et al. | |
| 2013/0009769 A1* | 1/2013 | Saito et al. | 340/466 |
| 2014/0097748 A1* | 4/2014 | Kato | 315/77 |

FOREIGN PATENT DOCUMENTS

| | | |
|---|---|---|
| JP | 2012-188071 A | 10/2012 |
| WO | 2011-148534 A1 | 12/2011 |

* cited by examiner

FIG. 1

FIG. 2

VEHICLE START NOTIFICATION CONTROL DEVICE

CROSS REFERENCE TO RELATED APPLICATION

This application claims the priority of Japanese Patent Application No. 2013-014727, filed on Jan. 29, 2013, the entire specification, claims and drawings of which are incorporated herewith by reference.

BACKGROUND OF THE INVENTION

1. Field of the Invention

The present invention relates to a vehicle start notification control device that performs control to notify a vehicle start to the surrounding of a vehicle when the vehicle starts.

2. Description of the Related Arts

When a vehicle, such as a hybrid vehicle or an electrical vehicle, having an electric motor for vehicle driving mounted thereon starts, almost no driving sound is generated because of the quietness of the electric motor. Consequently, it is difficult for a pedestrian or the like, who is in the surrounding of the vehicle, to auditorily recognize a behavior related to a start of the vehicle.

Addressing such a problem, for example, Patent Literature 1 (JP. 2012-188071 A) discloses a technology related to a vehicular start warning device provided with warning means for warning a vehicle start to outside the vehicle. The vehicular start warning device according to Patent Literature 1 includes ignition status detecting means for detecting the status of an ignition switch and control means that warns by warning means when warning condition is satisfied after a change in the ignition status from ignition-off to ignition-on has been detected by the ignition status detecting means, deactivates the warning made by the warning means when preset deactivating condition is satisfied, and does not warn by the warning means until ignition-off is thereafter once detected by the ignition status detecting means even if the warning condition is satisfied.

By the vehicular start warning device according to Patent Literature 1, as vehicle start warning is performed only at the first start of a vehicle in one ignition cycle with an assumption that the vehicle starts from a parking state, it is possible to reduce generation of noises, omitting opportunities of start warning.

Incidentally, in general, a vehicle is often started, using a creep torque that becomes explicit by decreasing brake pedal effort in a state that a driver's foot is off the accelerator pedal. Accordingly, by a vehicular start warning device as disclosed by Patent Literature 1, start notification is performed, taking a timing (deactivation timing) when a driver has decreased a brake pedal effort in addition to a timing that the driver has depressed the accelerator pedal.

On the other hand, for a purpose, such as reducing the load of braking operation by a driver, some recent vehicles have a braking force holding function to hold braking force even if a brake applying operation by the driver is deactivated. For example, Patent Literature 2 (JP. 2012-162146 A) discloses a vehicular technology wherein when a shift lever is operated when a vehicle has stopped or when the vehicle is in a stop state: if the shift position is the forward position, braking force holding control is permitted only when the running direction has a rising slope and braking force holding control is otherwise prohibited; on the other hand, if the shift position is the backward position, braking force holding control is permitted only when the running direction has a descending slope and braking force holding control is otherwise prohibited; and if the shift position is the neutral position, execution of braking force holding control is prohibited regardless of a slope.

By the vehicle having a braking force holding function according to Patent Literature 2, the vehicle is inhibited from moving down by gravity at a hill start, and on the other hand, if the shift position is the neutral position, running down on a slope by arbitrary braking operation by a driver is allowed so that the driver does not have a strange feeling.

SUMMARY OF THE INVENTION

However, by the vehicle having a braking force holding function according to Patent Literature 2, if application of an art for performing start notification taking a timing when a driver has decreased a brake pedal effort (a deactivation timing) is tried, although the vehicle is still in a stop state due to execution of the braking force holding function, in other words, although the deactivation of the brake pedal effort is not aimed at starting the vehicle, as a result of performing start notification, a problem is caused that the significance of start notification for alerting the surroundings of the vehicle in starting the vehicle may be lost.

The present invention has been developed to solve the above-described problem, and an object of the invention is to provide a vehicle start notification control device capable of controlling to perform vehicle start notification at an appropriate timing on a vehicle having a braking force holding function to hold a braking force even if a brake applying operation by a driver is deactivated.

To attain the above-described object, in a first aspect of the invention, a vehicle start notification control device includes: a start notification section for performing start notification to notify a behavior related to a start of a vehicle to surrounding of the vehicle; and a control section for performing control to apply a braking force to the vehicle, corresponding to a brake applying operation by a driver of the vehicle, and to hold the braking force of the vehicle even if the brake applying operation is deactivated, wherein when the control section is performing the control to hold the braking force of the vehicle even if the brake applying operation is deactivated, the control section controls the start notification section to perform the start notification if releasing condition for releasing the braking force held after the deactivation of the brake applying operation is satisfied.

According to the first aspect of the invention, when the control section is performing the control to hold the braking force of the vehicle even if the brake applying operation is deactivated, the control section controls the start notification section to perform start notification if releasing condition for releasing the braking force held after the deactivation of the brake applying operation is satisfied. Accordingly, it is possible to perform a start notification at an appropriate timing on a vehicle having a braking force holding function to hold a braking force even if a brake applying operation by a driver is deactivated.

Further, in a second aspect of the invention, a vehicle start notification control device includes: a start notification section for performing start notification to notify a behavior related to a start of a vehicle to surrounding of the vehicle; a control section for performing control to apply a braking force to the vehicle, corresponding to a brake applying operation by a driver of the vehicle, and hold a braking force of the vehicle even if the brake applying operation is deactivated; and a braking force holding flag setting section for setting a braking force holding flag for holding the braking force of the vehicle to ON or OFF even if the brake applying operation is deactivated, wherein when the braking force holding flag is set to ON by the braking force holding flag setting section, the control section performs control to hold the braking force of the vehicle even if the brake applying operation is deactivated, and if both the brake applying operation and the ON setting of the braking force holding flag by the braking force holding flag setting section are deactivated, the control section controls the start notification section to perform the start notification.

According to the second aspect of the invention, when both the brake applying operation and the ON setting of the braking force holding flag by the braking force holding flag setting section are deactivated, in other words, at a timing when the probability that the vehicle starts is high, the start notification section is controlled to perform start notification. Accordingly, it is possible to perform start notification at an appropriate timing on a vehicle having a braking force holding function to hold a braking force even if the brake applying operation by the driver is deactivated.

Still further, in a third aspect of the invention, the vehicle start notification control device in the second aspect of the invention is arranged such that ON setting of the braking force holding flag is deactivated when an instruction to decrease the braking operation of the vehicle having been held is issued by the control section.

In the third aspect of the intention, as a situation where an instruction to decrease a braking force, which has been held, of the vehicle is issued by the control section, for example, a case of decreasing a brake fluid pressure under control by an electrical serve brake system using a motor cylinder device, a case of decreasing a brake fluid pressure under control by a vehicle behavior stability assist system using a VSA device, a case that the operation of an electrical parking brake (EPB) is deactivated, or other cases are assumed.

According to the third aspect of the invention, even in a case that the invention is applied in combination with a system that autonomously performs braking operation (for example, an electrical servo brake system, a vehicle behavior stability assist system, or an electrical parking brake (EPB), etc.), it is possible to perform start notification at an appropriate timing suitable for the system to which the invention is applied.

Yet further, in a fourth aspect of the invention, the vehicle start notification control device in the second or the third aspect of the invention further includes: a start detection section for detecting a behavior related to a start of the vehicle, wherein the control section controls the start notification section to perform the start notification if both the brake applying operation and the ON setting of the braking force holding flag by the braking force holding flag setting section are deactivated and the start detection section has detected a behavior related to a start of the vehicle.

According to the fourth aspect of the invention, the start notification timing based on the second or the third aspect of the invention can be adjusted, taking into account a timing when a behavior related to a start of the vehicle has been detected, which contributes to improvement in the accuracy of start notification timing.

By a vehicle start notification control device according to the invention, it is possible to perform vehicle start notification at an appropriate timing on a vehicle having a braking force holding function to hold a braking force even if a brake applying operation by a driver is deactivated.

DETAILED DESCRIPTION OF THE PREFERRED EMBODIMENTS

A vehicle start notification control device in an embodiment according to the invention will be described below in detail, referring to the drawings.

In the drawings, members given a common reference symbol are assumed to be members having a common function or a corresponding function. For the convenience of illustration, the size or shape of a member may be schematically shown with deformation or exaggeration.

Figure 1:
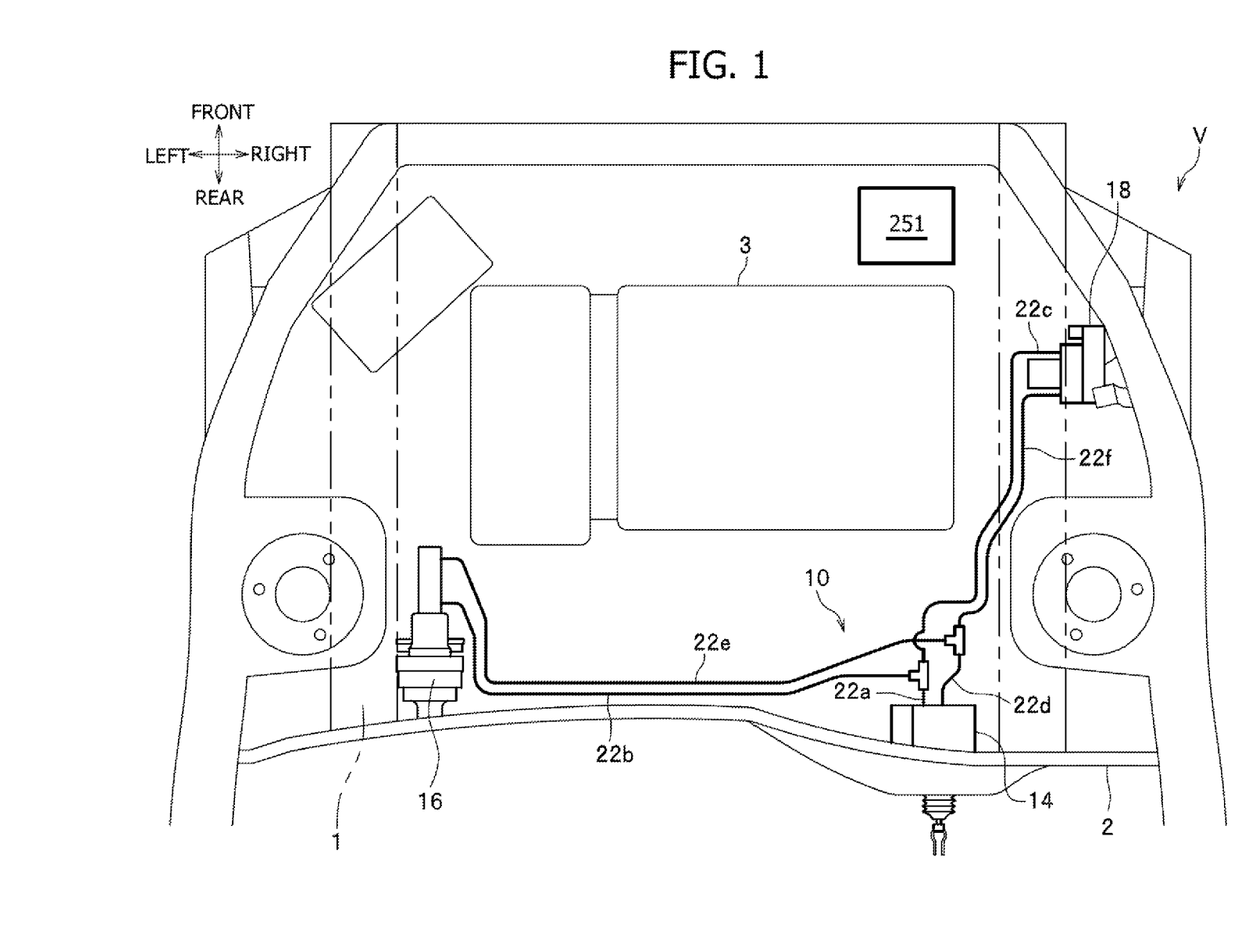
FIG. 1 is a diagram showing an example where a vehicular braking force generator configuring a part of a vehicle start notification control device in an embodiment according to the invention is mounted on a vehicle.

Example of Mounting on Vehicle V Vehicular Braking Force Generator 10 Configuring a Part of Vehicle Start Notification Control Device 7 in an Embodiment According to the Invention First of all, an example of mounting on a vehicle V a vehicular braking force generator 10 configuring a part of a vehicle start notification control device 7 in an embodiment according to the invention will be described referring to FIG. 1. FIG. 1 is a diagram showing an example where a vehicular braking force generator 10 is mounted on the vehicle V.

Incidentally, the front/rear/left/right directions of the vehicle V are represented by arrows in FIG. 1.

In addition to an existing brake system, which generates a braking force through a hydraulic circuit, the vehicular braking force generator 10 is provided with a by-wire brake system, which generates a braking force trough an electric circuit.

As shown in FIG. 1, the vehicular braking force generator 10 includes a vehicular fluid pressure generator 14, to which braking operation (including brake applying operation and brake deactivating operation) by a driver is input through a brake pedal 12 (see FIG. 2), a motor cylinder device 16 for generating a brake fluid pressure, based on an electrical signal corresponding at least to the braking operation, and a vehicle stability assist device 18 (hereinafter, abbreviated as "VSA device 18" wherein VSA is a registered trade mark) for assisting stabilization of the behavior of the vehicle, based on the brake fluid pressure generated by the motor cylinder device 16.

Further, the vehicle start notification control device 7 (see FIG. 3) is provided with a speaker 251 for generating a notification sound toward outside of the vehicle V in performing start notification of the vehicle V, the speaker 251 being arranged in an engine housing room.

Incidentally, the fluid pressure generator 14, the motor cylinder device 16, and the VSA device 18 are communicated and connected with each other through piping tubes 22a to 22f for flowing brake fluid.

The vehicular braking force generator 10 is applicable to any one of a front-wheel drive vehicle, a rear-wheel drive vehicle, and a four-wheel drive vehicle. Further, the fluid pressure generator 14 and the motor cylinder device 16 as a by-wire brake system, and the speaker 251 are electrically connected with a later-described ECU (Electronic Control Unit) 200 (see FIG. 3) by electrical wires, not shown.

(Outline of Vehicular Braking Force Generator 10)

Figure 2:
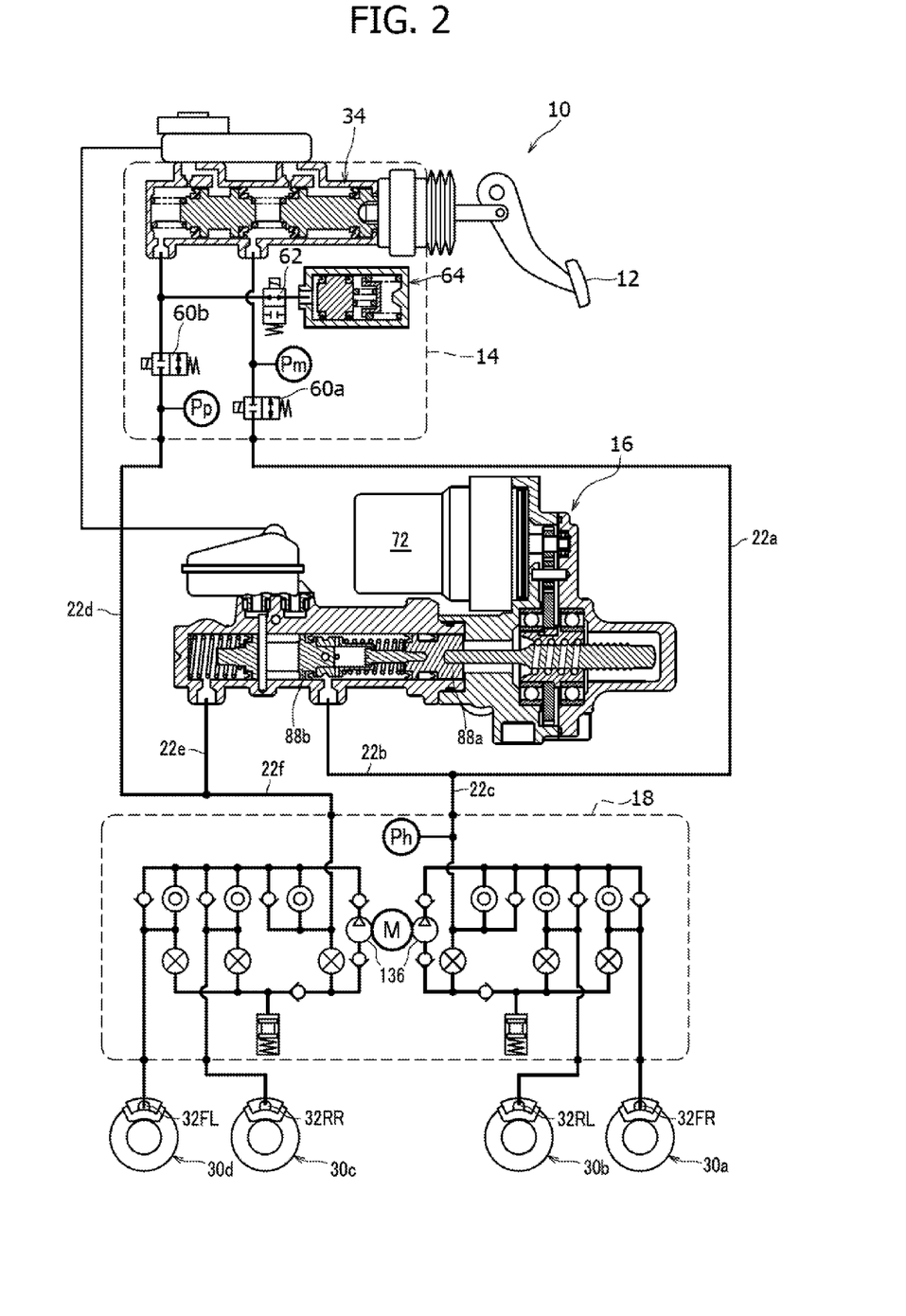
FIG. 2 is a configuration diagram showing the outline of the vehicular braking force generator.

FIG. 2 is a configuration diagram showing the outline of the vehicular braking force generator 10 configuring a part of the vehicle start notification control device 7 according to the present embodiment of the invention.

The vehicular braking force generator 10 includes a master cylinder 34 for converting a pedal effort having been input by the driver with the brake pedal 12 into a brake fluid pressure, the motor cylinder device 16 for generating a brake fluid pressure, corresponding to or independently from the brake fluid pressure generated by the master cylinder 34, the VSA device 18, disk brake mechanisms 30*a* to 30*d*, and the like. The motor cylinder device 16 is provided with first and second slave pistons 88*a*, 88*b* for generating a brake fluid pressure, receiving the driving force of an electric motor 72.

Incidentally, symbols Pm, Pp, Ph are brake fluid pressure sensors for detecting the brake fluid pressures of respective portions including the piping tubes 22*a* to 22*f*. Further, symbol 136 represents pumps provided in the VSA device 18 to generate a brake fluid pressure.

Other elements in FIG. 2 are not directly related to the invention, and description will be omitted.

(Basic Operation of Vehicular Braking Force Generator 10)

The basic operation of the vehicular braking force generator 10 will be described below.

By the vehicular braking force generator 10, during a normal operation state of the motor cylinder device 16 and the ECU 200 (see FIG. 3) for by-wire control, when the driver pedals the brake pedal 12, a so-called by-wire brake system becomes active. Concretely, by the vehicle start notification control device 7 during normal operation, if the driver pedals the brake pedal 12, then in a state that communication between the master cylinder 34 and the disk brake mechanisms 30*a*-30*d* (wheel cylinders 32FR, 32RL, 32RR, and 32FL) that brake the respective wheels is shut off by the first shut-off valve 60*a* and the second shut-off valve 60*b*, the disk brake mechanisms 30*a*-30*d* are operated, using brake fluid pressure generated by the motor cylinder device 16.

Accordingly, the vehicular braking force generator 10 can be appropriately applied to a vehicle, for example, an electric vehicle (including a fuel cell electric vehicle), a hybrid vehicle, or the like, in which generation of a negative pressure by an internal combustion engine is little or a negative pressure by an internal combustion engine does not exist, or can be applied to a vehicle without an internal combustion engine itself.

Incidentally, during normal operation, while the first shut-off valve 60*a* and the second shut-off valve 60*b* are shut off, the third shut-off valve is opened, and the brake fluid flows from the master cylinder 34 into a stroke simulator 64. Thus, even if the first shut-off valve 60*a* and the second shut-off valve 60*b* are shut off, brake fluid moves to cause a stroke on the brake pedal 12.

On the other hand, by the vehicular braking force generator 10 during abnormal state that the motor cylinder device 16 or the ECU 200 does not operate, if the driver pedals the brake pedal 12, the existing hydraulic brake system becomes active. Concretely, by the vehicular braking force generator 10 in an abnormal state, if the driver pedals the brake pedal 12, the first shut-off valve 60*a* and the second shut-off valve 60*b* are respectively made into an open state and the third shut-off valve 62 is made into a closed state to transmit the brake fluid pressure generated by the master cylinder 34 to the disk brake mechanisms 30*a* to 30*d* (wheel cylinders 32FR, 32RL, 32RR, 32FL) and thereby operate the above-described disk brake mechanisms 30*a* to 30*d* (wheel cylinders 32FR, 32RL, 32RR, 32FL).

Figure 3:
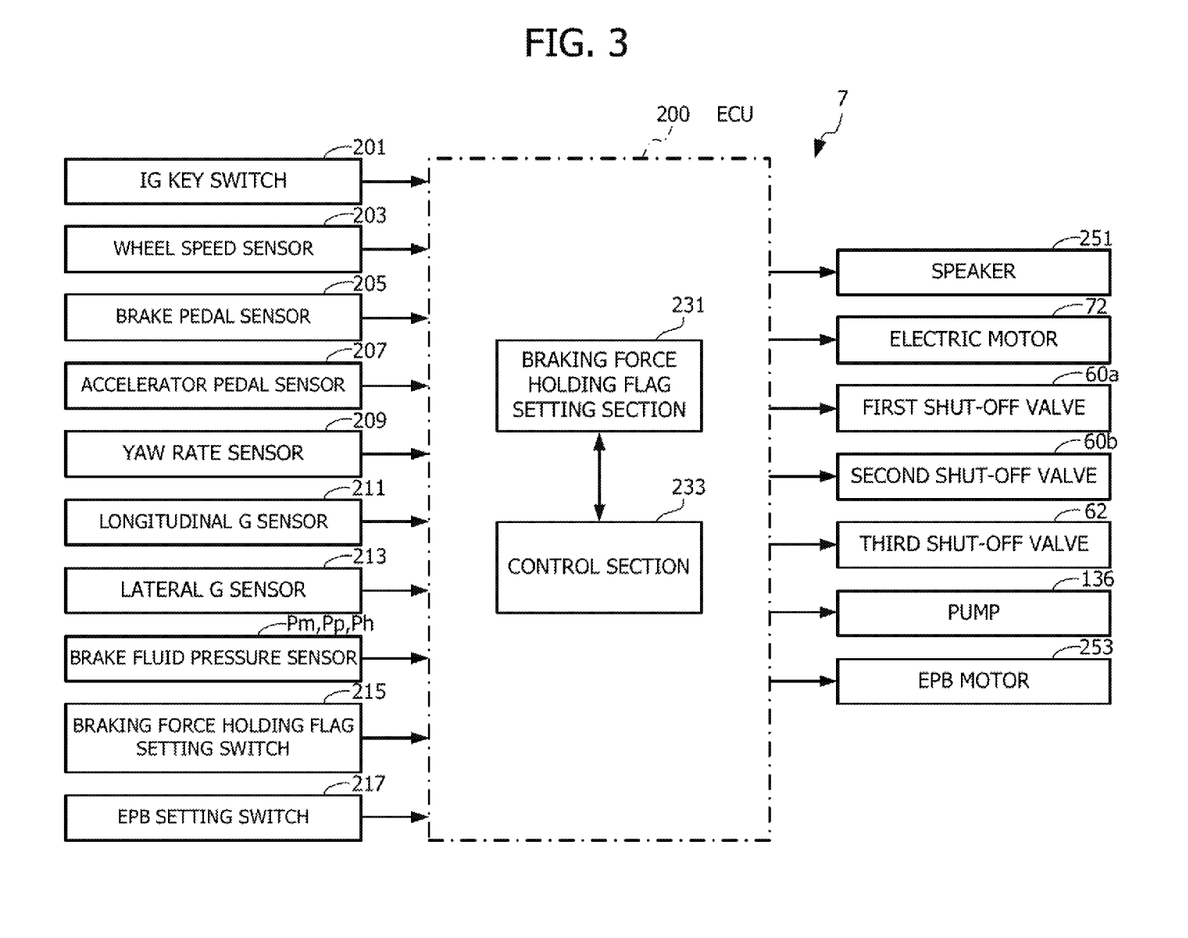
FIG. 3 is an illustration showing the peripheral configuration of an ECU of the vehicle start notification control device in the embodiment according to the invention.

Peripheral Configuration of ECU 200 of Vehicle Start Notification Control Device 7 in Embodiment According to the Invention In the following, the peripheral configuration of the ECU 200 of the vehicle start notification control device 7 according to the present embodiment of the invention will be described, referring to FIG. 3. FIG. 3 is an illustration showing the peripheral configuration of the ECU 700 included in the vehicle start notification control device 7 according to the present embodiment of the invention.

As an input system, the ECU 200 is connected, as shown in FIG. 3, with an ignition key switch (hereinafter abbreviated as "IG key switch") 201, a wheel speed sensor (corresponding to "start detection section" in the invention) 203, a brake pedal sensor 205, an accelerator pedal sensor 207, a yaw rate sensor 209, a longitudinal G sensor 211, a lateral G sensor 213, the above-described brake fluid pressure sensors Pm, Pp, Ph, a braking force holding flag setting switch 215, and an EPB setting switch 217.

The IG key switch 201 is a switch operated in supplying a power from an onboard battery (not shown) to respective parts of the vehicle V. When the IG key switch 201 is operated ON, a power is supplied to the ECU 200, and the ECU 200 is started.

The wheel speed sensor 203 has a function to detect the rotational speeds (wheel speeds) of the respective wheels. The wheel speed signals of the respective wheels detected by the wheel speed sensor 203 are transmitted to the ECU 200.

The brake pedal sensor 205 has a function to detect the operation amount (stroke amount) of the brake pedal 12 by the driver. A signal related to the operation amount (stroke amount) of the brake pedal 12 detected by the brake pedal sensor 205 is transmitted to the ECU 200.

Incidentally, the brake pedal sensor 205 may be a brake switch having a function to merely detect ON (pedaled) and OFF (not pedaled).

The accelerator pedal sensor 207 has a function to detect the pedaling operation amount of the accelerator pedal (not shown). A signal related to the pedaling operation amount of the accelerator pedal detected by the accelerator pedal sensor 207 is transmitted to the ECU 200.

The yaw rate sensor 209 has a function to detect a yaw rate generated on the vehicle V. A signal related to the yaw rate detected by the yaw rate sensor 209 is transmitted to the ECU 200.

The longitudinal G sensor 211, which is an acceleration sensor, has a function to detect a longitudinal G (longitudinal acceleration) generated on the vehicle V. A signal related to the longitudinal G detected by the longitudinal G sensor 211 is transmitted to the ECU 200.

The lateral G sensor 213, which is an acceleration sensor, has a function to detect a lateral G (lateral acceleration) generated on the vehicle V. A signal related to the lateral G detected by the lateral G sensor 213 is transmitted to the ECU 200.

The brake fluid pressure sensors Pm, Pp, Ph have a function to detect the fluid pressures of the respective parts including the piping tubes 22*a* to 22*f*. Signals related to the brake fluid pressures respectively detected by the brake fluid pressure sensors Pm, Pp, Ph are transmitted to the ECU 200.

The braking force holding flag setting switch 215 provided on an interior instrument panel (not shown) or the like is a switch operated by the driver in setting the braking force holding flag for holding the braking force of the vehicle V even if the brake applying operation by the driver of the vehicle V is deactivated. For example, when the IG key switch 201 is ON, if the braking force holding flag setting switch 215 is set to ON, the ECU 200 performs braking force control to hold the braking force of the vehicle V even if the braking applying operation by the driver is deactivated. On the other hand, when the IG key switch 201 is ON, if the braking force holding flag setting switch 215 is set to OFF, the ECU 200 does not perform the above-described braking force control.

Incidentally, the braking force holding flag setting switch 215 may be set to ON as default to adopt configuration that omits operation by the driver.

When the IG key switch 201 is ON and the braking force holding flag setting switch 215 is set to ON, even if the driver of the vehicle V does not make an effort to perform parking brake operation nor operation to set the shift lever to P range, or even if the driver is away from the vehicle V, the vehicle start notification control device 7 according to the present embodiment of the invention operates such as to control to hold the braking force of the vehicle V by an electric serve brake system using the motor cylinder device 16 or a vehicle behavior stability assist system using the VSA device 18.

Incidentally, the vehicle start notification control device 7 according to the present embodiment of the invention having the above-described braking force holding function may include an on-slope braking force holding function to execute the braking force holding function when the vehicle V is on a slope road, an at-start braking force holding function to execute the braking force holding function during the period from an idle stop until generation of a creep force capable of starting the vehicle V, and other functions. However, the braking force holding function that the invention assumes has a feature that enables holding a braking force for a longer time, compared with the above-described on-slope braking force holding function and the at-start braking force holding function. Incidentally, in order to realize holding a braking force for a long time, for the vehicle start notification control device 7 according to the present embodiment of the invention, it is devised to attain smooth coordination between a braking mechanism (for example, the electric motor 72, the first to third shut-off valves 60a, 60b, 62, a pump 136, etc.) using a hydraulic pressure and a mechanical braking mechanism (for example, an EPB motor 253 and the like) including an electric parking brake (which may be hereinafter referred to as "EPB").

The EPB setting switch 217 arranged on the interior instrument panel or the like is a switch that is operated by the driver to set ON or OFF of the operation of the EPB. For example, when the IG key switch 201 is ON and the EPB setting switch 217 is set to ON, the ECU 200 performs control to operate the later-described EPB motor 253 at a rotation speed corresponding to a vehicle speed. On the other hand, when the IG key switch 201 is ON and the EPB setting switch 217 is set to OFF, the ECU 200 performs control to stop the operation of the EPB motor 253.

On the other hand, as shown in FIG. 3, for an output system, the ECU 200 is connected with the speaker (corresponding to "start notification section" in the invention) 251 used to perform start notification, the above-described electric motor 72, the first to third shut-off valves 60a, 60b, 62, the pumps 136, and the EPB motor 253 for driving parking mechanisms (not shown) for operating calipers (not shown), the driving parking mechanisms being arranged at the respective disk brake mechanisms 30a to 30d.

As shown in FIG. 3, the ECU 200 includes a braking force holding flag setting section 231 and a control section 233.

The ECU 200 is configured by a microcomputer provided with a CPU (Central Processing Unit), a ROM (Read Only Memory), a RAM (Random Access Memory), and the like. This microcomputer reads out a program and data stored in the ROM and execute the program to operate so as to perform execution control related to various functions, which the ECU 200 has, including a braking force holding flag setting function and a function to control applying or holding of a braking force and control the timing of a start notification.

The braking force holding flag setting section 231 has a function to store a setting content related to ON or OFF of the braking force holding flag for holding the braking force of the vehicle V even if the brake applying operation by the driver of the vehicle V is deactivated. Such setting related to ON or OFF of the braking force holding flag is performed, based on ON/OFF operation of the braking force holding flag setting switch 215.

The control section 233 applies a braking force to the vehicle, corresponding to a brake applying operation by the driver of the vehicle V, and on the other hand, has a function to hold the braking force of the vehicle V even if the brake applying operation by the driver of the vehicle V is deactivated.

In detail, when the control section 233 is performing control to hold the braking force of the vehicle V even if the brake applying operation by the driver is deactivated, if releasing condition for releasing the braking force held after the deactivation of the brake applying operation is satisfied, the control section 233 operates to control the speaker (start notification section) 251 to perform start notification. Concretely, when the braking force holding flag is set to ON by the braking force holding flag setting section 231, even if the brake applying operation is deactivated, the control section 233 performs control to hold the braking force of the vehicle V, and when both the brake applying operation and ON setting of the braking force holding flag by the braking force holding flag setting section 231 are deactivated, the control section 233 operates to control the speaker (start notification section) 251 to perform start notification.

Operation of Vehicle Start Notification Control Device 7 in Embodiment According to the Invention In the following, the operation of the vehicle start notification control device 7 according to the present embodiment of the invention will be described, referring to FIGS. 4A-4F. FIGS. 4A-4F are time chart diagrams used for illustration of the operation of the vehicle start notification control device 7 according to the present embodiment of the invention.

It will be assumed that the IG key switch 201 is ON, and the braking force holding flag setting switch 215 is set to ON.

Figure 4A:
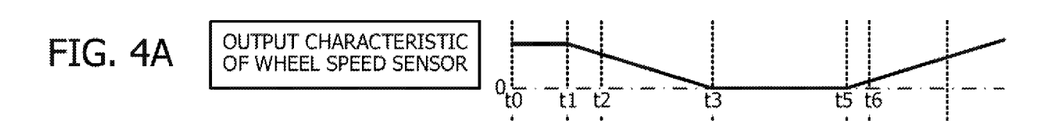
FIGS. 4A-4F are time chart diagrams used for illustration of the operation of the vehicle start notification control device in the embodiment according to the invention.

The vehicle V runs at a constant speed during time period t0-t1 which is shown in FIGS. 4A-4F, as represented by the output characteristic of the wheel speed sensor 203 in FIG. 4A. Herein, as represented by the output characteristic of the brake pedal sensor 205 in FIG. 4B, the brake pedal 12 is not subjected to brake applying operation.

Figure 4B:
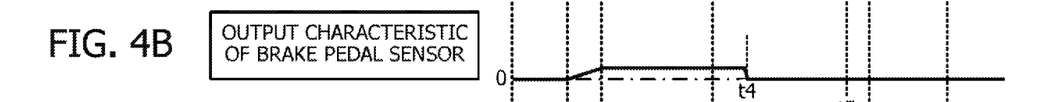
Figure 4C:
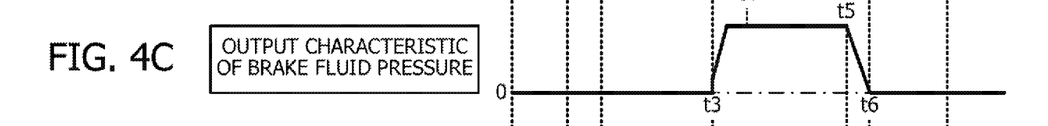
Figure 4D:
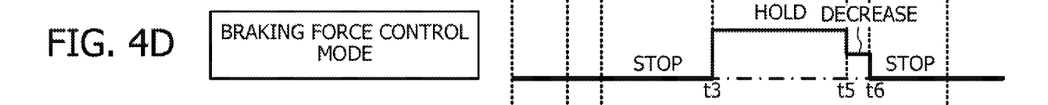

Incidentally, during time period t0-t1 which is shown in FIGS. 4A-4F, the brake fluid pressure output characteristic applied to the respective calipers of the disk brake mechanisms 30a-30d indicates "0" (see FIG. 4C). The braking force control mode representing the instruction state of the control section 233 for controlling the braking force is in a stop state (see FIG. 4D). The braking force holding flag is set to OFF (see FIG. 4E). The start notification output characteristic by the speaker 251 is in OFF state (see FIG. 4F).

During time period t1-t2 which is shown in FIGS. 4A-4F, the brake pedal 12 is subjected to a gradual brake applying operation (see FIG. 4B), and the vehicle V thereby gradually decelerates as represented by the output characteristic of the wheel speed sensor 203 in FIG. 4A.

Incidentally, during time period t1-t2 which is shown in FIGS. 4A-4F, the brake fluid pressure output characteristic indicates "0" (see FIG. 4C). The braking force control mode is in a stop state (see FIG. 4D). The braking force holding flag is set to OFF (see FIG. 4E). The start notification output characteristic by the speaker 251 is in OFF state (see FIG. 4F).

During time period t2-t3 which is shown in FIGS. 4A-4F, the brake applying operation of the brake pedal 12 is maintained (see FIG. 4B), and the vehicle V gradually decelerates continuously and following the time period t1-t2 shown in FIGS. 4A-4F, as represented by the output characteristic of the wheel speed sensor 203 in FIG. 4A.

Incidentally, during time period t2-t3 shown in FIGS. 4A-4F, the brake fluid pressure output characteristic indicates "0" (see FIG. 4C). The braking force control mode is in a stop state (see FIG. 4D). The braking force holding flag is set to OFF (see FIG. 4E). The start notification output characteristic by the speaker 251 is in OFF state (see FIG. 4F).

During time period t3-t5 shown in FIGS. 4A-4F, the vehicle V is in a stop state as represented by the output characteristic of the wheel speed sensor 203 shown in FIG. 4A. Herein, as represented by the output characteristic, shown in FIG. 4B, of the brake pedal sensor 205, the brake applying operation of the brake pedal 12 is maintained until time t4, and thereafter, a "0" state (a state that the brake applying operation of the brake pedal 12 is deactivated) is maintained (see FIG. 4B).

Incidentally, during time period t3-t5, shown in FIGS. 4A-4F, the brake fluid pressure output characteristic rapidly increases from time t3 as beginning until the brake fluid pressure reaches a target fluid pressure (if the brake fluid pressure has not reached the target pressure), and thereafter shows a characteristic of maintaining the target fluid pressure (see FIG. 4C). Herein, the target fluid pressure refers to a fluid pressure that is fixedly set in advance or variably set due to the necessity of maintaining the vehicle V in a stop state under control by the electric serve brake system using the motor cylinder device 16 or under control by the vehicle behavior stability assist system using the VSA device 18. The braking force control mode transitions from a stop state to a holding state (see FIG. 4D). The braking force holding flag is changed from OFF setting to ON setting (see FIG. 4E). The start notification output characteristic by the speaker 251 is in OFF state (see FIG. 4F).

Incidentally, even when the vehicle V is in a stop state on a slope road and the pedaling of the brake pedal 12 is deactivated at time t4, as the brake fluid pressure is held as shown in FIG. 4C, the vehicle V can maintain the stop state.

Further, the change in the braking force holding flag from OFF setting to ON setting at time t3 is based on the operation of the control section 233 for which conditions for changing setting of the braking force holding flag are that the vehicle V is in a stop state and that the brake applying operation of the brake pedal 12 is made.

During the time period t5-t6, shown in FIGS. 4A-4F, when the accelerator pedal is pedaled by the driver with an intention to start the vehicle V, the vehicle V gradually accelerates as represented by the output characteristic, shown in FIG. 4A, of the wheel speed sensor 203. Herein, the output characteristic of the brake pedal sensor 205 maintains a "0" state (a state that the brake applying operation of the brake pedal 12 is deactivated) (see FIG. 4B).

Incidentally, at time t5 shown in FIGS. 4A-4F, an instruction to decrease the braking force of the vehicle V having been held is issued by the control section 233. Accordingly, during time t5-t6 shown in FIGS. 4A-4F, the braking force control mode transitions from a holding state to a decreasing state in stages (see FIG. 4D).

Herein, as a situation where an instruction to decrease a braking force, which has been held, of the vehicle V is issued by the control section 233, for example, there are a case of decreasing a brake fluid pressure under control by an electrical serve brake system using the motor cylinder device 16, a case of decreasing a brake fluid pressure under control by a vehicle behavior stability assist system using the VSA device 18, and a case that the operation of the electrical parking brake (EPB) is deactivated (the braking force being decreased by deactivating the operation of the EPB).

Figure 4E:
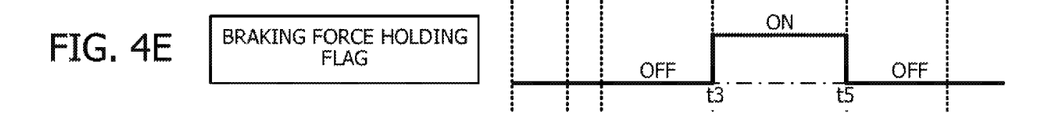
Figure 4F:
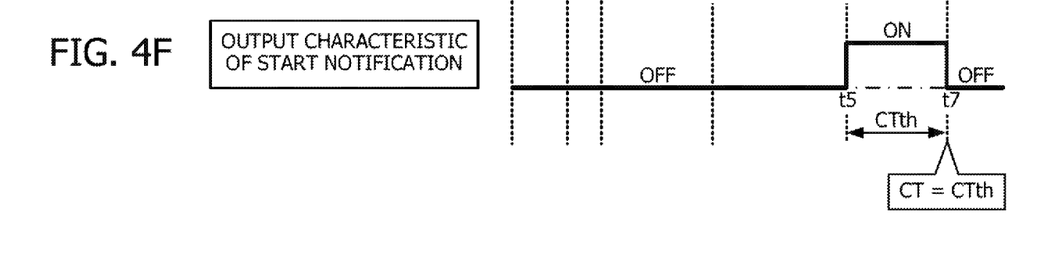

The braking force holding flag is changed from ON setting to OFF setting by the operation of the control section 233, being triggered by the timing t5 when the braking force control mode has transitioned from the holding state to the decreasing state (see FIG. 4E). This is because the probability that the vehicle V starts from the stop state is considered to be high at the timing when the braking force control mode transitions from the holding state to the decreasing state. In brief, the braking force holding flag is changed from ON setting to OFF setting with an appropriate prediction of a timing when the vehicle V starts from the stop state.

The control section 233 controls the speaker (start notification section) 251 to perform a start notification to the surrounding of the vehicle V, beginning from the time t5 when both the brake applying operation and ON setting of the braking force holding flag by the braking force holding flag setting section 231 are deactivated (in other words, beginning from the time t5 when the releasing condition is satisfied) (see FIG. 4B and FIG. 4E). Thus, the start notification output characteristic by the speaker 251 transitions from OFF state to ON state (see FIG. 4F).

During the time period t6-t7 shown in FIGS. 4A-4F, the vehicle V gradually accelerates as shown by the output characteristic of the wheel speed sensor 203 in FIG. 4A, continuously and following the time period t5-t6. Herein, the output characteristic of the brake pedal sensor 205 maintains "0" state (the state that the brake applying operation of the brake pedal 12 is deactivated) (see FIG. 4B).

Incidentally, during time t6-t7 shown in FIGS. 4A-4F, the output characteristic of brake fluid pressure shows "0" (see FIG. 4C). The braking force control mode transitions from a decreasing state to a stop state, beginning from time t6 in stages, and thereafter maintains the stop state (see FIG. 4D). The braking force holding flag is set to OFF (see FIG. 4E). The start notification output characteristic by the speaker 251 is ON state (see FIG. 4F).

During the time t6-t7 shown in FIGS. 4A-4F, the control section 233 compares a counter accumulation value CT counted beginning from time t5 and a preset start notification continuance time threshold value CTth, and successively determines whether the counter accumulation value CT has agreed with the start notification continuance time threshold value CTth. As a result, when a determination is made that the counter accumulation value CT has agreed with the start notification continuance time threshold value CTth (see time t7), the control section 233 stops the start notification by the speaker 251 (start notification section) to the surrounding of the vehicle V.

Incidentally, the start notification continuance time threshold value CTth can be set in advance to a suitable length, taking into account effective alerting of pedestrians and the like who are in the surroundings of the vehicle V, at a start of the vehicle V.

Operation and Advantages of Vehicle Start Notification Control Device 7 in Embodiment According to the Invention The operation and advantages of the vehicle start notification control device 7 according to the present embodiment of the invention will be described below.

According to the first aspect of the invention, the vehicle start notification control device 7 is configured such that when the control section 233 is performing the control to hold the braking force of the vehicle V even if the brake applying operation is deactivated, the control section 233 controls the start notification section (start notification section) 251 to perform start notification if releasing condition for releasing the braking force held after the deactivation of the braking force operation is satisfied.

By the vehicle start notification control device 7 based on the first aspect, it is possible to perform a start notification at an appropriate timing on the vehicle V having a braking force holding function to hold a braking force even if a brake applying operation by a driver is deactivated. Incidentally, in a conventional art, a start notification is performed at time t4 in FIG. 4B. Accordingly, even when the start notification is performed, as the time lag until t5 when an actual start of the vehicle V is performed is long, the significance of a start notification for alerting the surroundings of the vehicle to a start of the vehicle would be lost.

In more detail, the deactivation, of pedaling the brake pedal 12, performed at time t4 is not aimed at a start of the vehicle V. Pedaling operation of the accelerator pedal by the driver performed at t5 is aimed at a start of the vehicle V.

The vehicle start notification control device 7 based on the second aspect is configured such that when the braking force holding flag is set to ON by the braking force holding flag setting section 231, even if the brake applying operation is deactivated, the control section 233 performs control to hold the braking force of the vehicle V, and when both the brake applying operation and ON setting of the braking force holding flag by the braking force holding flag setting section 231 are deactivated, the control section 233 operates to control the speaker (start notification section) 251 to perform start notification.

For the vehicle start notification control device 7 based on the second aspect, as a situation where the releasing condition related to the first aspect is satisfied, the situation is defined that both a brake applying operation and ON setting of the braking force holding flag by the braking force holding flag setting section 231 are deactivated.

By the vehicle start notification control device 7 based on the second aspect, at a timing when the probability that the vehicle V starts is high, the speaker (start notification section) 251 is controlled to perform start notification. Accordingly, it is possible to perform a start notification at an appropriate timing on the vehicle V having the braking force holding function to hold a braking force even if the brake applying operation by the driver is deactivated.

The vehicle start notification control device 7 based on the third aspect is configured such that ON setting of the braking force holding flag is deactivated when an instruction, to decrease the braking force of the vehicle V having been held, is issued by the control section 233.

Herein, as a situation where the instruction, to decrease the braking force of the vehicle V having been held, is issued by the control section 233, there are, for example, a case of decreasing a brake fluid pressure under control by the electrical serve brake system using the motor cylinder device 16, a case of decreasing a brake fluid pressure under control by the vehicle behavior stability assist system using the VSA device 18, and a case that the operation of the electrical parking brake (EPB) is deactivated.

By the vehicle start notification control device 7 based on the third aspect, even in a case that the invention is applied in combination with a system that autonomously performs braking operation (for example, an electrical servo brake system, a vehicle behavior stability assist system, or an electrical parking system (EPB), etc.), it is possible to perform start notification at an appropriate timing suitable for the system to which the invention is applied.

The vehicle start notification control device 7 based on the fourth aspect is configured such as to further include the wheel speed sensor (start detection section) 203 for detecting a behavior related to a start of the vehicle V, wherein the control section 233 controls the speaker (start notification section) 251 to perform start notification if both the brake applying operation and ON setting of the braking force holding flag by the braking force holding flag setting section 231 are deactivated and the wheel speed sensor (start detection section) 203 has detected a behavior related to a start of the vehicle V.

By the vehicle start notification control device 7 based on the fourth aspect, as a start notification timing based on the second or the third aspect can be adjusted, taking into account a timing when a behavior related to a start of the vehicle has been detected, which contributes to improvement in the accuracy of a start notification timing.

Other Embodiments

The forgoing plural embodiment is an example of carrying out the invention. Accordingly, the technical scope of the invention is not to be interpreted with limitation thereto. This is because the invention can be carried out in various embodiments without departing from the spirit and main features of the invention.

For example, in the description of the above-described embodiment of the invention, although, as an example, the speaker 251 has been described as the start notification section according to the invention, the invention is not limited thereto. As a start notification section according to the invention, an element capable of stimulating the human sense of hearing, for example, a buzzer or a horn may be adopted in general.

Further, for example, in an embodiment of start notification using the speaker 251, appropriate content and sound volume can be set in advance, taking into account effective alerting of pedestrians and the like who are in the surroundings of the vehicle V, at a start of the vehicle V.

Still further, in the description of the above-described embodiment of the invention, although, as an example, the wheel speed sensor 203 has been described as the start detection section according to the invention, the invention is not limited to this example. As a start detection section according to the invention, an element capable of detecting a behavior related to a start of the vehicle V, for example, a vehicle speed sensor or the longitudinal G sensor 211 may be appropriately adopted in general.

Yet further, as releasing condition in an embodiment according to the invention, for example, pedal releasing of the brake pedal 12 (Brake SW is OFF.), ultralow speed 5 km/h or lower, and pedaling operation of an accelerator pedal may be made condition, and it is also possible to appropriately set condition which enables recognizing an intention of starting a vehicle V by a driver.

What is claimed is:

1. A vehicle start notification control device, comprising: a start notification section for performing start notification to notify a behavior related to a start of a vehicle to surrounding of the vehicle; a control section for performing control to apply a braking force to the vehicle, corresponding to a brake applying operation by a driver of the vehicle, and to hold the braking force of the vehicle even if the brake applying operation is deactivated; and a braking force holding flag setting section for setting a braking force holding flag for holding the braking force of the vehicle to ON or OFF even if the brake applying operation is deactivated, wherein when the braking force holding flag is set to ON by the braking force holding flag setting section, the control section performs control to hold the braking force of the vehicle even if the brake applying operation is deactivated, and if both the brake applying operation and the ON setting of the braking force holding flag by the braking force holding flag setting section are deactivated, wherein ON setting of the braking force holding flag is deactivated when an instruction to decrease the braking operation of the vehicle having been held is issued by the control section, the control section controls the start notification section to perform the start notification.

2. The vehicle start notification control device according to claim 1, further comprising: a start detection section for detecting a behavior related to a start of the vehicle, wherein the control section controls the start notification section to perform the start notification if both the brake applying operation and the ON setting of the braking force holding flag by the braking force holding flag setting section are deactivated and the start detection section has detected a behavior related to a start of the vehicle.

3. A vehicle start notification control device, comprising:
a start notification section wherein the start notification section performs start notification to notify a behavior related to a start of a vehicle to surrounding of the vehicle;
a control section for performing control to apply a braking force to the vehicle, corresponding to a brake applying operation by a driver of the vehicle, and to hold the braking force of the vehicle even if the brake applying operation is deactivated;
a braking force holding flag setting section for setting a braking force holding flag for holding the braking force of the vehicle to ON or OFF even if the brake applying operation is deactivated, wherein when the braking force holding flag is set to ON by the braking force holding flag setting section, and the control section performs control to hold the braking force of the vehicle even if the brake applying operation is deactivated, and if both the brake applying operation and the ON setting of the braking force holding flag by the braking force holding flag setting section are deactivated;
wherein the ON setting of the braking force holding flag is deactivated when an instruction to decrease the braking operation of the vehicle having been held is issued by the control section, and the control section controls the start notification section to perform the start notification; and
the control device further comprises a start detection section for detecting a behavior related to a start of the vehicle, wherein the control section controls the start notification section to perform the start notification if both the brake applying operation and the ON setting of the braking force holding flag by the braking force holding flag setting section are deactivated and the start detection section has detected a behavior related to a start of the vehicle.

* * * * *